(12) United States Patent
Uehara

(10) Patent No.: US 7,516,171 B2
(45) Date of Patent: Apr. 7, 2009

(54) ARITHMETIC UNIT AND METHOD FOR DATA STORAGE AND READING

(75) Inventor: Teruaki Uehara, Kanagawa (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 629 days.

(21) Appl. No.: 10/642,735

(22) Filed: Aug. 19, 2003

(65) Prior Publication Data

US 2004/0039766 A1    Feb. 26, 2004

(30) Foreign Application Priority Data

Aug. 22, 2002    (JP)    ............... 2002-241371

(51) Int. Cl.
*G06F 7/38*    (2006.01)
*G06F 17/10*   (2006.01)

(52) U.S. Cl. ...................... 708/490; 708/518
(58) Field of Classification Search ............ 708/490, 708/518, 523
See application file for complete search history.

(56) References Cited

U.S. PATENT DOCUMENTS 3,631,230 A * 12/1971 Chen ................. 708/231
4,700,324 A * 10/1987 Doi et al. ................. 708/552
5,132,898 A *  7/1992 Sakamura et al. ........... 712/210
5,440,504 A *  8/1995 Ishikawa et al. ............ 708/490
5,499,380 A *  3/1996 Iwata et al. ................. 711/212
5,754,875 A *  5/1998 Getzlaff et al. ............... 712/33
6,408,320 B1 *  6/2002 Shiell .......................... 708/518
6,480,868 B2 * 11/2002 Abdallah et al. ............ 708/204

FOREIGN PATENT DOCUMENTS

| JP | 61-080331 | 4/1986 |
| JP | 03-129425 | 6/1991 |
| JP | 04-167134 | 6/1992 |
| JP | 08-147458 | 6/1996 |
| JP | 11-272546 | 10/1999 |
| JP | 2002-007110 | 1/2002 |

* cited by examiner

*Primary Examiner*—Chuong D Ngo
(74) *Attorney, Agent, or Firm*—Volentine & Whitt, P.L.L.C.

(57) ABSTRACT

An arithmetic unit includes a memory, an arithmetic logic unit, a register and a combining circuit. The arithmetic logic unit executes a predetermined arithmetic operation with respect to the data read from memory. The register temporarily stores the data read from the memory. The combining circuit selects one of the arithmetic logic unit and the register. The combining circuit replaces a part of the data read from the memory with output data received from the selected one of the arithmetic logic unit and the register.

9 Claims, 18 Drawing Sheets

FIG. 2

DATA IN FIRST MEMORY BLOCK

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| n | R0 ||||||| I0 |||||||||
| n + 2 | UNUSED DATA ||| R1 |||||||||| I1 |||
| n + 4 | I3 |||||||| UNUSED DATA ||| R2 |||||
| n + 6 | R4 ||||||| I4 |||||||||

DATA IN SECOND MEMORY BLOCK

| ADDRESS | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| n + 1 | I1 |||||||||| UNUSED DATA ||| R0 |||
| n + 3 | R2 ||||||| I2 |||||||||
| n + 5 | UNUSED DATA ||| R3 |||||||||| I3 |||
| n + 7 | I5 ||||||| UNUSED DATA ||| R4 |||||

FIG. 3

| ADDRESS | DATA IN SECOND MEMORY BLOCK | | | | | | | | | | | | | | | |
|---|---|---|---|---|---|---|---|---|---|---|---|---|---|---|---|---|
| | F | E | D | C | B | A | 9 | 8 | 7 | 6 | 5 | 4 | 3 | 2 | 1 | 0 |
| 1 | . | . | . | 1 | . | . | . | ] | * | * | * | * | [ | . | . | ] |
| 3 | R | 2 | . | . | . | ] | . | . | R | 3 | . | . | 2 | . | . | ] |
| 5 | * | * | * | 5 | . | . | . | ] | * | * | * | * | [ | . | . | ] |
| 7 | R | 6 | . | . | . | ] | . | . | R | 7 | . | . | 6 | . | . | ] |
| 9 | * | * | * | 9 | . | . | . | ] | * | * | * | * | [ | . | . | ] |
| 11 | R | 10 | . | . | . | ] | . | . | R | 11 | . | . | 10 | . | . | ] |
| 13 | * | * | * | 13 | . | . | . | ] | * | * | * | * | [ | . | . | ] |
| 15 | R | 14 | . | . | . | ] | . | . | R | 15 | . | . | 14 | . | . | ] |
| 17 | * | * | * | 17 | . | . | . | ] | * | * | * | * | [ | . | . | ] |
| 19 | R | 18 | . | . | . | ] | . | . | R | 19 | . | . | 18 | . | . | ] |
| 21 | * | * | * | 21 | . | . | . | ] | * | * | * | * | [ | . | . | ] |
| 23 | R | 22 | . | . | . | ] | . | . | R | 23 | . | . | 22 | . | . | ] |
| 25 | * | * | * | 25 | . | . | . | ] | * | * | * | * | [ | . | . | ] |
| 27 | R | 26 | . | . | . | ] | . | . | R | 27 | . | . | 26 | . | . | ] |

| ADDRESS | DATA IN FIRST MEMORY BLOCK | | | | | | | | | | | | | | | |
|---|---|---|---|---|---|---|---|---|---|---|---|---|---|---|---|---|
| | F | E | D | C | B | A | 9 | 8 | 7 | 6 | 5 | 4 | 3 | 2 | 1 | 0 |
| 0 | R | 0 | . | . | . | ] | . | . | . | . | . | 0 | . | . | . | ] |
| 2 | * | * | * | * | [ | . | . | ] | . | * | * | * | [ | . | . | ] |
| 4 | . | . | . | 3 | . | . | . | ] | . | R | 1 | . | . | . | . | ] |
| 6 | R | 4 | . | . | . | ] | . | . | * | * | * | 4 | [ | . | . | ] |
| 8 | * | * | * | * | [ | . | . | ] | . | R | 5 | . | . | . | . | ] |
| 10 | . | . | . | 7 | . | . | . | ] | * | * | * | 8 | [ | . | . | ] |
| 12 | R | 8 | . | . | . | ] | . | . | . | . | . | . | . | . | . | ] |
| 14 | * | * | * | * | [ | . | . | ] | . | R | 9 | . | . | . | . | ] |
| 16 | . | . | . | 11 | . | . | . | ] | * | * | * | 12 | [ | . | . | ] |
| 18 | R | 12 | . | . | . | ] | . | . | . | . | . | . | . | . | . | ] |
| 20 | * | * | * | * | [ | . | . | ] | . | R | 13 | . | . | . | . | ] |
| 22 | . | . | . | 15 | . | . | . | ] | * | * | * | 16 | [ | . | . | ] |
| 24 | R | 16 | . | . | . | ] | . | . | . | . | . | . | . | . | . | ] |
| 26 | * | * | * | * | [ | . | . | ] | . | R | 17 | . | . | . | . | ] |
| 28 | . | . | . | 19 | . | . | . | ] | * | * | * | 20 | [ | . | . | ] |
| 30 | R | 20 | . | . | . | ] | . | . | . | . | . | . | . | . | . | ] |
| 32 | * | * | * | * | [ | . | . | ] | . | R | 21 | . | . | . | . | ] |
| 34 | . | . | . | 23 | . | . | . | ] | * | * | * | 24 | [ | . | . | ] |
| 36 | R | 24 | . | . | . | ] | . | . | . | . | . | . | . | . | . | ] |
| 38 | * | * | * | * | [ | . | . | ] | . | R | 25 | . | . | . | . | ] |

(Note: due to complexity and partial legibility of the figure, exact values in some cells may vary; table reproduced to best reading.)

FIG. 4

DATA IN SECOND MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 41 | * | - | - | - | - | - | - | - | R | 2 | 7 | - | - | ] | - | - |
| 43 | - | - | 2 | 9 | - | - | ] | - | - | * | * | * | - | ] | - | - |
| 45 | R | 3 | 0 | - | - | - | - | - | R | 3 | 1 | - | - | [ | - | - |
| 47 | * | - | - | 3 | 3 | - | - | ] | - | * | * | * | - | ] | - | - |
| 49 | - | - | 3 | 4 | - | - | ] | - | R | 3 | 5 | - | - | [ | - | - |
| 51 | R | 3 | 4 | - | - | - | - | - | - | * | * | * | - | ] | - | - |
| 53 | * | - | - | 3 | 7 | - | - | [ | - | - | - | - | 3 | 8 | - | ] |
| 55 | R | 3 | 8 | - | - | - | - | - | R | 3 | 9 | - | - | [ | - | - |
| 57 | * | - | - | - | - | - | - | - | - | * | * | * | - | ] | - | - |
| 59 | - | - | 4 | 1 | - | - | [ | - | - | - | - | - | 4 | 2 | - | ] |
| 61 | R | 4 | 2 | - | - | - | - | - | R | 4 | 3 | - | - | [ | - | - |
| 63 | * | - | - | 4 | 5 | - | - | ] | - | * | * | * | - | ] | - | - |
| 65 | - | - | 4 | 6 | - | - | ] | - | R | 4 | 7 | - | - | [ | - | - |
| 67 | R | 4 | 6 | - | - | - | - | - | - | * | * | * | - | ] | - | - |
| 69 | * | - | - | 4 | 9 | - | - | [ | - | - | - | - | 5 | 0 | - | ] |
| 71 | R | 5 | 0 | - | - | - | - | - | R | 5 | 1 | - | - | [ | - | - |
| 73 | * | - | - | - | - | - | - | - | - | * | * | * | - | ] | - | - |
| 75 | - | - | 5 | 3 | - | - | [ | - | - | - | - | - | - | - | - | - |
| 77 | * | - | - | - | - | - | - | - | - | * | * | * | - | ] | - | - |
| 79 | - | - | - | - | - | - | [ | - | - | - | - | - | - | - | - | - |

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 40 | - | - | - | - | - | - | - | - | * | * | * | * | - | ] | - | - |
| 42 | R | 2 | 8 | - | - | - | - | ] | - | R | 2 | 9 | - | [ | - | - |
| 44 | - | * | * | - | 3 | 1 | - | ] | - | * | * | * | - | 2 | 8 | - |
| 46 | - | - | 3 | 2 | - | - | ] | - | - | * | * | * | - | ] | - | - |
| 48 | R | 3 | 2 | - | - | - | - | ] | - | - | - | 3 | 2 | - | - | - |
| 50 | * | * | * | - | 3 | 5 | - | [ | - | * | * | * | - | ] | - | - |
| 52 | - | - | 3 | 6 | - | - | ] | - | R | 3 | 3 | - | - | [ | - | - |
| 54 | R | 3 | 6 | - | - | - | - | ] | - | * | * | * | - | - | - | - |
| 56 | - | * | * | - | 3 | 9 | - | ] | - | R | 3 | 7 | - | [ | - | - |
| 58 | - | - | 4 | 0 | - | - | ] | - | - | - | - | 4 | 0 | - | - | - |
| 60 | R | 4 | 0 | - | - | - | - | ] | - | * | * | * | - | ] | - | - |
| 62 | * | * | * | - | 4 | 3 | - | [ | - | R | 4 | 1 | - | [ | - | - |
| 64 | - | - | 4 | 4 | - | - | ] | - | - | * | * | * | - | ] | - | - |
| 66 | R | 4 | 4 | - | - | - | - | ] | - | - | - | 4 | 4 | - | - | - |
| 68 | * | * | * | - | 4 | 7 | - | [ | - | R | 4 | 5 | - | [ | - | - |
| 70 | - | - | 4 | 8 | - | - | ] | - | - | * | * | * | - | ] | - | - |
| 72 | R | 4 | 8 | - | - | - | - | ] | - | - | - | 4 | 8 | - | - | - |
| 74 | * | * | * | - | 5 | 1 | - | [ | - | R | 4 | 9 | - | [ | - | - |
| 76 | - | - | 5 | 2 | - | - | ] | - | - | * | * | * | - | ] | - | - |
| 78 | R | 5 | 2 | - | - | - | - | ] | - | - | - | 5 | 2 | - | - | - |

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 160 | - | - | - | - | 1 | 0 | 7 | - | * | * | * | * | - | - | - | - |
| 162 | R | 1 | 0 | 8 | - | - | - | ] | - | R | 1 | 0 | 9 | - | - | ] |
| 164 | * | * | * | * | - | 1 | 1 | - | - | R | 1 | 1 | 0 | - | - | ] |
| 166 | - | - | - | - | 1 | 1 | 1 | - | * | * | * | * | - | 1 | 1 | - |
| 168 | R | 1 | 1 | 2 | - | - | - | ] | - | R | 1 | 1 | 3 | - | - | ] |
| 170 | * | * | * | * | - | 1 | 1 | 5 | - | R | 1 | 1 | 3 | - | - | ] |
| 172 | - | 1 | 1 | 6 | - | 1 | 1 | 5 | * | * | * | * | - | 1 | 1 | 6 | - |
| 174 | R | 1 | 1 | 6 | - | - | - | ] | - | R | 1 | 1 | 7 | - | - | ] |
| 176 | * | * | * | * | - | 1 | 1 | 9 | - | R | 1 | 1 | 7 | - | - | ] |
| 178 | - | - | - | - | 1 | 1 | 9 | - | * | * | * | * | - | 1 | 2 | 0 | - |
| 180 | R | 1 | 2 | 0 | - | - | - | ] | - | R | 1 | 2 | 1 | - | - | ] |
| 182 | * | * | * | * | - | 1 | 2 | 3 | - | R | 1 | 2 | 1 | - | - | ] |
| 184 | - | 1 | 2 | 4 | - | 1 | 2 | 3 | * | * | * | * | - | 1 | 2 | 4 | - |
| 186 | R | 1 | 2 | 4 | - | - | - | ] | - | R | 1 | 2 | 5 | - | - | ] |
| 188 | * | * | * | * | - | 1 | 2 | 7 | - | R | 1 | 2 | 5 | - | - | ] |
| 190 | - | - | - | - | 1 | 2 | 7 | - | * | * | * | * | - | 1 | 2 | 8 | - |
| 192 | R | 1 | 2 | 8 | - | - | - | ] | - | R | 1 | 2 | 9 | - | - | ] |
| 194 | * | * | * | * | - | 1 | 3 | 1 | - | R | 1 | 2 | 9 | - | - | ] |
| 196 | - | 1 | 3 | 2 | - | 1 | 3 | 1 | * | * | * | * | - | 1 | 3 | 2 | - |
| 198 | R | 1 | 3 | 2 | - | - | - | ] | - | - | - | - | - | - | - | - |

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 161 | * | * | * | * | - | - | - | - | - | R | 1 | 0 | 7 | - | - | ] |
| 163 | - | 1 | 1 | 0 | - | 0 | 9 | - | * | * | * | * | - | - | - | - |
| 165 | R | 1 | 1 | 0 | - | - | - | ] | - | - | 1 | 1 | 1 | - | - | ] |
| 167 | * | * | * | * | - | 1 | 1 | 3 | - | R | 1 | 1 | 1 | - | - | ] |
| 169 | - | 1 | 1 | 4 | - | 1 | 1 | 3 | * | * | * | * | - | 1 | 1 | 4 | - |
| 171 | R | 1 | 1 | 4 | - | - | - | ] | - | R | 1 | 1 | 5 | - | - | ] |
| 173 | * | * | * | * | - | 1 | 1 | 7 | - | R | 1 | 1 | 5 | - | - | ] |
| 175 | - | - | - | - | 1 | 1 | 7 | - | * | * | * | * | - | 1 | 1 | 8 | - |
| 177 | R | 1 | 1 | 8 | - | - | - | ] | - | R | 1 | 1 | 9 | - | - | ] |
| 179 | * | * | * | * | - | 1 | 2 | 1 | - | R | 1 | 1 | 9 | - | - | ] |
| 181 | - | 1 | 2 | 2 | - | 1 | 2 | 1 | * | * | * | * | - | 1 | 2 | 2 | - |
| 183 | R | 1 | 2 | 2 | - | - | - | ] | - | R | 1 | 2 | 3 | - | - | ] |
| 185 | * | * | * | * | - | 1 | 2 | 5 | - | R | 1 | 2 | 3 | - | - | ] |
| 187 | - | 1 | 2 | 6 | - | 1 | 2 | 5 | * | * | * | * | - | 1 | 2 | 6 | - |
| 189 | R | 1 | 2 | 6 | - | - | - | ] | - | R | 1 | 2 | 7 | - | - | ] |
| 191 | * | * | * | * | - | 1 | 2 | 9 | - | R | 1 | 2 | 7 | - | - | ] |
| 193 | - | - | - | - | 1 | 2 | 9 | - | * | * | * | * | - | 1 | 3 | 0 | - |
| 195 | R | 1 | 3 | 0 | - | - | - | ] | - | R | 1 | 3 | 1 | - | - | ] |
| 197 | * | * | * | * | - | 1 | 3 | 3 | - | R | 1 | 3 | 1 | - | - | ] |
| 199 | - | 1 | 3 | 3 | - | - | - | - | * | * | * | * | - | - | - | - |

DATA IN SECOND MEMORY BLOCK

FIG. 8

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 200 | * | * | * | * | [ | - | - | ] | - | * | * | * | [ | - | ] | - |
| 202 | - | - | 1 | 3 | 5 | - | ] | - | R | 1 | 3 | 3 | - | ] | [ | - |
| 204 | R | 1 | 3 | 6 | - | ] | [ | - | * | * | * | * | [ | 3 | 6 | - |
| 206 | * | * | * | * | [ | - | ] | - | R | 1 | 3 | 7 | - | ] | [ | - |
| 208 | - | - | 1 | 3 | 9 | - | ] | [ | - | * | * | * | [ | - | ] | - |
| 210 | R | 1 | 4 | 0 | - | ] | [ | - | * | * | * | * | [ | 4 | 0 | - |
| 212 | * | * | * | * | [ | - | ] | - | R | 1 | 4 | 1 | - | ] | [ | - |
| 214 | R | 1 | 4 | 4 | - | ] | [ | - | * | * | * | * | [ | - | ] | - |
| 216 | * | * | * | * | [ | - | ] | - | R | 1 | 4 | 5 | - | ] | [ | 4 | 4 | - |
| 218 | - | - | 1 | 4 | 7 | - | ] | [ | - | * | * | * | [ | - | ] | - |
| 220 | * | * | * | * | [ | - | ] | - | R | 1 | 4 | 9 | - | ] | [ | - |
| 222 | R | 1 | 4 | 8 | - | ] | [ | - | * | * | * | * | [ | 4 | 8 | - |
| 224 | * | * | * | * | [ | - | ] | - | R | 1 | 4 | 9 | - | ] | [ | - |
| 226 | - | - | 1 | 5 | 1 | - | ] | [ | - | * | * | * | [ | - | ] | - |
| 228 | R | 1 | 5 | 2 | - | ] | [ | - | * | * | * | * | [ | 5 | 2 | - |
| 230 | * | * | * | * | [ | - | ] | - | R | 1 | 5 | 3 | - | ] | [ | - |
| 232 | - | - | 1 | 5 | 5 | - | ] | - | * | * | * | * | [ | - | ] | - |
| 234 | R | 1 | 5 | 6 | - | ] | [ | - | * | * | * | * | [ | 5 | 6 | - |
| 236 | * | * | * | * | [ | - | ] | - | R | 1 | 5 | 7 | - | ] | [ | - |
| 238 | - | - | 1 | 5 | 9 | - | ] | [ | - | * | * | * | [ | - | ] | - |

DATA IN SECOND MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 201 | R | 1 | 3 | 4 | - | ] | [ | - | * | * | * | * | [ | 3 | 4 | - |
| 203 | * | * | * | * | [ | - | ] | - | R | 1 | 3 | 5 | - | ] | [ | - |
| 205 | - | - | 1 | 3 | 7 | - | ] | [ | - | * | * | * | [ | - | ] | - |
| 207 | R | 1 | 3 | 8 | - | ] | [ | - | * | * | * | * | [ | 3 | 8 | - |
| 209 | * | * | * | * | [ | - | ] | - | R | 1 | 3 | 9 | - | ] | [ | - |
| 211 | - | - | 1 | 4 | 1 | - | ] | [ | - | * | * | * | [ | - | ] | - |
| 213 | R | 1 | 4 | 2 | - | ] | [ | - | * | * | * | * | [ | 4 | 2 | - |
| 215 | * | * | * | * | [ | - | ] | - | R | 1 | 4 | 3 | - | ] | [ | - |
| 217 | - | - | 1 | 4 | 5 | - | ] | [ | - | * | * | * | [ | - | ] | - |
| 219 | R | 1 | 4 | 6 | - | ] | [ | - | * | * | * | * | [ | 4 | 6 | - |
| 221 | * | * | * | * | [ | - | ] | - | R | 1 | 4 | 7 | - | ] | [ | - |
| 223 | - | - | 1 | 4 | 9 | - | ] | [ | - | * | * | * | [ | - | ] | - |
| 225 | R | 1 | 5 | 0 | - | ] | [ | - | * | * | * | * | [ | 5 | 0 | - |
| 227 | * | * | * | * | [ | - | ] | - | R | 1 | 5 | 1 | - | ] | [ | - |
| 229 | - | - | 1 | 5 | 3 | - | ] | [ | - | * | * | * | [ | - | ] | - |
| 231 | R | 1 | 5 | 4 | - | ] | [ | - | * | * | * | * | [ | 5 | 4 | - |
| 233 | * | * | * | * | [ | - | ] | - | R | 1 | 5 | 5 | - | ] | [ | - |
| 235 | - | - | 1 | 5 | 7 | - | ] | [ | - | * | * | * | [ | - | ] | - |
| 237 | R | 1 | 5 | 8 | - | ] | [ | - | * | * | * | * | [ | 5 | 8 | - |
| 239 | * | * | * | * | [ | - | ] | - | R | 1 | 5 | 9 | - | ] | [ | - |

FIG. 9

DATA IN SECOND MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 241 | - | - | - | - | 1 | 6 | 1 | - | * | * | * | * | - | - | - | - |
| 243 | R | 1 | 6 | 2 | - | - | - | ] | - | - | R | 1 | 6 | 2 | - | ] |
| 245 | * | * | * | - | 1 | 6 | 5 | ] | - | - | - | 1 | 6 | 3 | - | [ |
| 247 | - | - | 1 | 6 | 6 | - | - | ] | - | - | R | 1 | 6 | 6 | - | ] |
| 249 | R | 1 | 6 | 6 | - | - | - | ] | * | * | * | 1 | 6 | 7 | - | [ |
| 251 | * | * | * | - | 1 | 6 | 9 | ] | - | - | R | 1 | 7 | 0 | - | ] |
| 253 | - | - | 1 | 7 | 0 | - | - | ] | - | - | - | - | - | - | - | - |
| 255 | R | 1 | 7 | 0 | - | - | - | ] | * | * | * | 1 | 7 | 1 | - | [ |
| 257 | * | * | * | - | 1 | 7 | 3 | ] | - | - | R | 1 | 7 | 4 | - | ] |
| 259 | - | - | 1 | 7 | 4 | - | - | ] | - | - | - | - | - | - | - | - |
| 261 | R | 1 | 7 | 4 | - | - | - | ] | * | * | * | 1 | 7 | 5 | - | [ |
| 263 | * | * | * | - | 1 | 7 | 7 | ] | - | - | R | 1 | 7 | 8 | - | ] |
| 265 | - | - | 1 | 7 | 8 | - | - | ] | - | - | - | - | - | - | - | - |
| 267 | R | 1 | 7 | 8 | - | - | - | ] | * | * | * | 1 | 7 | 9 | - | [ |
| 269 | * | * | * | - | 1 | 8 | 1 | ] | - | - | R | 1 | 8 | 2 | - | ] |
| 271 | - | - | 1 | 8 | 2 | - | - | ] | - | - | - | - | - | - | - | - |
| 273 | R | 1 | 8 | 2 | - | - | - | ] | * | * | * | 1 | 8 | 3 | - | [ |
| 275 | * | * | * | - | 1 | 8 | 5 | ] | - | - | R | 1 | 8 | 3 | - | ] |
| 277 | - | - | 1 | 8 | 6 | - | - | ] | - | - | - | - | - | - | - | - |
| 279 | R | 1 | 8 | 6 | - | - | - | ] | - | - | - | - | - | - | - | - |

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 240 | R | 1 | 6 | 0 | - | - | - | ] | - | - | - | 1 | 6 | 0 | - | [ |
| 242 | * | * | * | - | 1 | 6 | 3 | ] | - | - | R | 1 | 6 | 1 | - | ] |
| 244 | - | - | 1 | 6 | 4 | - | - | ] | * | * | * | 1 | 6 | 4 | - | [ |
| 246 | R | 1 | 6 | 4 | - | - | - | ] | - | - | R | 1 | 6 | 5 | - | ] |
| 248 | * | * | * | - | 1 | 6 | 7 | ] | * | * | * | - | - | - | - | - |
| 250 | - | - | 1 | 6 | 8 | - | - | ] | - | - | - | 1 | 6 | 8 | - | [ |
| 252 | R | 1 | 6 | 8 | - | - | - | ] | * | * | * | 1 | 6 | 9 | - | ] |
| 254 | * | * | * | - | 1 | 7 | 1 | ] | - | - | - | - | - | - | - | - |
| 256 | - | - | 1 | 7 | 2 | - | - | ] | - | - | - | 1 | 7 | 2 | - | [ |
| 258 | R | 1 | 7 | 2 | - | - | - | ] | * | * | * | 1 | 7 | 3 | - | ] |
| 260 | * | * | * | - | 1 | 7 | 5 | ] | - | - | - | - | - | - | - | - |
| 262 | - | - | 1 | 7 | 6 | - | - | ] | - | - | - | 1 | 7 | 6 | - | [ |
| 264 | R | 1 | 7 | 6 | - | - | - | ] | * | * | * | 1 | 7 | 7 | - | ] |
| 266 | * | * | * | - | 1 | 7 | 9 | ] | - | - | - | - | - | - | - | - |
| 268 | - | - | 1 | 8 | 0 | - | - | ] | - | - | - | 1 | 8 | 0 | - | [ |
| 270 | R | 1 | 8 | 0 | - | - | - | ] | * | * | * | 1 | 8 | 1 | - | ] |
| 272 | * | * | * | - | 1 | 8 | 3 | ] | - | - | - | - | - | - | - | - |
| 274 | - | - | 1 | 8 | 4 | - | - | ] | - | - | - | 1 | 8 | 4 | - | [ |
| 276 | R | 1 | 8 | 4 | - | - | - | ] | * | * | * | 1 | 8 | 5 | - | ] |
| 278 | - | - | - | - | - | - | - | - | - | - | - | - | - | - | - | - |

FIG. 10

DATA IN SECOND MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 281 | * | * | * | * | * | - | - | - | - | R | 1 | 8 | 7 | - | - | - |
| 283 | - | - | - | - | 8 | 9 | - | - | ] | * | * | * | - | ] | - | ] |
| 285 | R | 1 | 9 | 0 | - | - | - | - | - | R | 1 | 9 | 1 | - | - | - |
| 287 | * | * | * | * | - | - | - | - | ] | * | * | * | - | ] | - | ] |
| 289 | - | 1 | 9 | 4 | - | 9 | 3 | - | - | - | - | - | - | - | - | - |
| 291 | R | 1 | 9 | 4 | - | - | - | - | - | R | 1 | 9 | 5 | - | - | - |
| 293 | * | * | * | * | - | - | - | - | ] | * | * | * | - | ] | - | ] |
| 295 | - | 1 | 9 | 8 | - | 9 | 7 | - | - | - | - | - | - | - | - | - |
| 297 | R | 1 | 9 | 8 | - | - | - | - | - | R | 1 | 9 | 9 | - | - | - |
| 299 | * | * | * | * | - | - | - | - | ] | * | * | * | - | ] | - | ] |
| 301 | - | 2 | 0 | 2 | - | 2 | 0 | 1 | - | - | - | - | - | - | - | - |
| 303 | R | 2 | 0 | 2 | - | - | - | - | - | R | 2 | 0 | 3 | - | - | - |
| 305 | * | * | * | * | - | - | - | - | ] | * | * | * | - | ] | - | ] |
| 307 | - | 2 | 0 | 6 | - | 2 | 0 | 5 | - | - | - | - | - | - | - | - |
| 309 | R | 2 | 0 | 6 | - | - | - | - | - | R | 2 | 0 | 7 | - | - | - |
| 311 | * | * | * | * | - | - | - | - | ] | * | * | * | - | ] | - | ] |
| 313 | - | 2 | 1 | 0 | - | 2 | 0 | 9 | - | - | - | - | - | - | - | - |
| 315 | R | 2 | 1 | 0 | - | - | - | - | - | R | 2 | 1 | 1 | - | - | - |
| 317 | * | * | * | * | - | - | - | - | ] | * | * | * | - | ] | - | ] |
| 319 | - | 2 | 1 | 2 | - | 2 | 1 | 3 | - | - | - | - | - | - | - | - |

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 280 | - | - | - | - | - | - | - | - | * | * | * | * | - | - | - | - |
| 282 | R | 1 | 8 | 8 | - | 8 | 7 | - | - | - | - | 1 | 8 | 8 | - | ] |
| 284 | * | * | * | * | - | - | - | - | - | R | 1 | 8 | 9 | - | - | - |
| 286 | - | - | - | - | - | 9 | 1 | - | ] | * | * | * | - | ] | - | ] |
| 288 | R | 1 | 9 | 2 | - | - | - | - | - | - | - | 1 | 9 | 2 | - | - |
| 290 | * | * | * | * | - | - | - | - | - | R | 1 | 9 | 3 | - | - | - |
| 292 | - | - | - | - | - | 9 | 5 | - | ] | * | * | * | - | ] | - | ] |
| 294 | R | 1 | 9 | 6 | - | - | - | - | - | - | - | 1 | 9 | 6 | - | - |
| 296 | * | * | * | * | - | - | - | - | - | R | 1 | 9 | 7 | - | - | - |
| 298 | - | - | - | - | - | 9 | 9 | - | ] | * | * | * | - | ] | - | ] |
| 300 | R | 2 | 0 | 0 | - | - | - | - | - | - | - | 2 | 0 | 0 | - | - |
| 302 | * | * | * | * | - | - | - | - | - | R | 2 | 0 | 1 | - | - | - |
| 304 | - | - | - | - | - | 2 | 0 | 3 | - | ] | * | * | * | - | ] | - |
| 306 | R | 2 | 0 | 4 | - | - | - | - | - | - | - | 2 | 0 | 4 | - | - |
| 308 | * | * | * | * | - | - | - | - | - | R | 2 | 0 | 5 | - | - | - |
| 310 | - | - | - | - | - | 2 | 0 | 7 | - | ] | * | * | * | - | ] | - |
| 312 | R | 2 | 0 | 8 | - | - | - | - | - | - | - | 2 | 0 | 8 | - | - |
| 314 | * | * | * | * | - | - | - | - | - | R | 2 | 0 | 9 | - | - | - |
| 316 | - | - | - | - | - | 2 | 1 | 1 | - | ] | * | * | * | - | ] | - |
| 318 | R | 2 | 1 | 2 | - | - | - | - | - | - | - | 2 | 1 | 2 | - | - |

FIG. 11

DATA IN SECOND MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 321 | R | 2 | 1 | 4 | - | ] | [ | - | - | - | - | 2 | 1 | 4 | - | ] |
| 323 | * | * | * | * | - | ] | [ | - | - | - | - | 2 | 1 | 5 | - | ] |
| 325 | - | - | 2 | 1 | 7 | - | ] | [ | - | R | 2 | 1 | 5 | - | - | ] |
| 327 | R | 2 | 1 | 8 | - | ] | [ | - | * | * | * | 2 | 1 | 8 | - | ] |
| 329 | * | * | * | * | - | ] | [ | - | - | - | - | 2 | 1 | 9 | - | ] |
| 331 | - | - | 2 | 2 | 1 | - | ] | [ | - | R | 2 | 1 | 9 | - | - | ] |
| 333 | R | 2 | 2 | 2 | - | ] | [ | - | * | * | * | 2 | 2 | 2 | - | ] |
| 335 | * | * | * | * | - | ] | [ | - | - | - | - | 2 | 2 | 3 | - | ] |
| 337 | - | - | 2 | 2 | 5 | - | ] | [ | - | R | 2 | 2 | 3 | - | - | ] |
| 339 | R | 2 | 2 | 6 | - | ] | [ | - | * | * | * | 2 | 2 | 6 | - | ] |
| 341 | * | * | * | * | - | ] | [ | - | - | - | - | 2 | 2 | 7 | - | ] |
| 343 | - | - | 2 | 2 | 9 | - | ] | [ | - | R | 2 | 2 | 7 | - | - | ] |
| 345 | R | 2 | 3 | 0 | - | ] | [ | - | * | * | * | 2 | 3 | 0 | - | ] |
| 347 | * | * | * | * | - | ] | [ | - | - | - | - | 2 | 3 | 1 | - | ] |
| 349 | - | - | 2 | 3 | 3 | - | ] | [ | - | R | 2 | 3 | 1 | - | - | ] |
| 351 | R | 2 | 3 | 4 | - | ] | [ | - | * | * | * | 2 | 3 | 4 | - | ] |
| 353 | * | * | * | * | - | ] | [ | - | - | - | - | 2 | 3 | 5 | - | ] |
| 355 | - | - | 2 | 3 | 7 | - | ] | [ | - | R | 2 | 3 | 5 | - | - | ] |
| 357 | R | 2 | 3 | 8 | - | ] | [ | - | * | * | * | 2 | 3 | 8 | - | ] |
| 359 | * | * | * | * | - | ] | [ | - | - | - | - | 2 | 3 | 9 | - | ] |

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 320 | * | * | * | * | - | ] | [ | - | - | R | 2 | 1 | 3 | - | - | ] |
| 322 | - | - | 2 | 1 | 5 | - | ] | [ | - | * | * | * | 2 | 1 | 6 | ] |
| 324 | R | 2 | 1 | 6 | - | ] | [ | - | - | - | - | 2 | 1 | 7 | - | ] |
| 326 | * | * | * | * | - | ] | [ | - | - | R | 2 | 1 | 7 | - | - | ] |
| 328 | - | - | 2 | 1 | 9 | - | ] | [ | - | * | * | * | 2 | 2 | 0 | ] |
| 330 | R | 2 | 2 | 0 | - | ] | [ | - | - | - | - | 2 | 2 | 1 | - | ] |
| 332 | * | * | * | * | - | ] | [ | - | - | R | 2 | 2 | 1 | - | - | ] |
| 334 | - | - | 2 | 2 | 3 | - | ] | [ | - | * | * | * | 2 | 2 | 4 | ] |
| 336 | R | 2 | 2 | 4 | - | ] | [ | - | - | - | - | 2 | 2 | 5 | - | ] |
| 338 | * | * | * | * | - | ] | [ | - | - | R | 2 | 2 | 5 | - | - | ] |
| 340 | - | - | 2 | 2 | 7 | - | ] | [ | - | * | * | * | 2 | 2 | 8 | ] |
| 342 | R | 2 | 2 | 8 | - | ] | [ | - | - | - | - | 2 | 2 | 9 | - | ] |
| 344 | * | * | * | * | - | ] | [ | - | - | R | 2 | 2 | 9 | - | - | ] |
| 346 | - | - | 2 | 3 | 1 | - | ] | [ | - | * | * | * | 2 | 3 | 2 | ] |
| 348 | R | 2 | 3 | 2 | - | ] | [ | - | - | - | - | 2 | 3 | 3 | - | ] |
| 350 | * | * | * | * | - | ] | [ | - | - | R | 2 | 3 | 3 | - | - | ] |
| 352 | - | - | 2 | 3 | 5 | - | ] | [ | - | * | * | * | 2 | 3 | 6 | ] |
| 354 | R | 2 | 3 | 6 | - | ] | [ | - | - | - | - | 2 | 3 | 7 | - | ] |
| 356 | * | * | * | * | - | ] | [ | - | - | R | 2 | 3 | 7 | - | - | ] |
| 358 | - | - | 2 | 3 | 9 | - | ] | [ | - | * | * | * | - | - | - | ] |

FIG. 12

DATA IN FIRST MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 360 | R | 2 | 4 | 0 | - | ] | [ | - | - | - | - | 2 | 4 | 0 | - | ] |
| 362 | * | * | * | * | - | 2 | 4 | 3 | - | ] | - | 2 | 4 | 1 | - | [ |
| 364 | - | R | 2 | 4 | 4 | - | ] | [ | - | R | 2 | 4 | - | ] | [ | - |
| 366 | * | * | * | * | - | 2 | 4 | 7 | - | ] | - | 2 | 4 | 4 | - | ] |
| 368 | - | - | 2 | 4 | 8 | - | ] | [ | - | - | - | 2 | 4 | 5 | - | [ |
| 370 | R | 2 | 4 | 8 | - | ] | [ | - | R | 2 | 4 | - | ] | [ | - | - |
| 372 | * | * | * | * | - | 2 | 5 | 1 | - | ] | - | 2 | 4 | 8 | - | ] |
| 374 | - | - | 2 | 5 | 2 | - | ] | [ | - | - | R | 2 | 4 | 9 | - | [ |
| 376 | R | 2 | 5 | 2 | - | ] | [ | - | R | 2 | 5 | - | ] | [ | - | - |
| 378 | * | * | * | * | - | 2 | 5 | 5 | - | ] | - | 2 | 5 | 2 | - | ] |
| 380 | - | - | 2 | 5 | 5 | - | ] | [ | - | - | R | 2 | 5 | 3 | - | [ |
| 382 | * | * | * | * | - | - | - | - | - | - | - | - | - | - | - | - |

DATA IN SECOND MEMORY BLOCK

| ADDRESS | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 361 | - | - | 2 | 4 | 1 | - | ] | [ | * | * | * | * | - | - | - | - |
| 363 | R | 2 | 4 | 2 | - | ] | [ | - | - | R | 2 | 4 | 2 | - | ] | - |
| 365 | * | * | * | * | - | 2 | 4 | 5 | - | ] | - | 2 | 4 | 3 | - | [ |
| 367 | - | R | 2 | 4 | 6 | - | ] | [ | - | R | 2 | 4 | - | ] | - | - |
| 369 | * | * | * | * | - | 2 | 4 | 9 | - | ] | - | 2 | 4 | 6 | - | ] |
| 361 | - | - | 2 | 4 | - | - | ] | [ | - | R | 2 | 4 | 7 | - | ] | - |
| 373 | R | 2 | 5 | 0 | - | ] | [ | - | - | R | 2 | 5 | - | ] | [ | - |
| 375 | * | * | * | * | - | 2 | 5 | 3 | - | ] | - | 2 | 5 | 1 | - | [ |
| 377 | - | R | 2 | 5 | - | - | ] | [ | - | R | 2 | 5 | - | ] | - | - |
| 379 | R | 2 | 5 | 4 | - | ] | [ | - | - | - | - | 2 | 5 | 4 | - | ] |
| 381 | * | * | * | * | - | - | - | - | - | R | 2 | 5 | 5 | - | ] | - |
| 383 | * | * | * | * | - | - | - | - | - | - | - | - | - | - | - | - |

US 7,516,171 B2

ARITHMETIC UNIT AND METHOD FOR DATA STORAGE AND READING

BACKGROUND OF THE INVENTION

The present invention relates to an arithmetic unit for executing an arithmetic process with respect to data in which a word is not standard $2^n$-bit wide.

Some devices for outputting or processing image and audio, use data in which a word is not standard $2^n$-bit wide. This is for improving image and audio quality, or for providing image and audio with any additional information. Such devices are exemplified by so-called third generation mobile phones or information processors for generating image data with various tones. This type devices include a digital signal processor (hereinafter, referred to as DSP) or other type of arithmetic unit. Using such devices, a bit width for a word is converted into a standard $2^n$-bit for various arithmetic processes.

In the below, by taking a DSP mounted in a third generation mobile phone as an example, an arithmetic unit of a conventional type is described.

The third generation mobile phone uses a DSP for extracting signals in several specific bands out of a wide frequency band for achieving communications always good in condition. From the extraction result, one specific frequency band especially high in reception sensitivity is selected for communications. Here, for such signal extraction, the DSP uses a technique called digital matched filter (hereinafter, referred to as DMF) algorithm, which will be described later, to emphasize path intensity of signals in specific bands, and thereby extracts signals in the specific bands.

The DSP of a conventional type outputs 16-bit data at a time from memory to an arithmetic logic unit (hereinafter, referred to as ALU). The issue here is that, an arithmetic process does not require all of the 16-bit data but only 10-bit. It means that the conventional arithmetic unit wastefully outputs 6-bit data to the ALU at a time.

The ALU includes a 32-bit-wide arithmetic section (not shown), but is only utilizing a part thereof, i.e., section of 10-bit wide. It means that the arithmetic section of 22-bit wide goes to waste with the conventional arithmetic unit.

As such, when executing an arithmetic process using data in which a word is not standard $2^n$-bit wide, the arithmetic unit of the conventional type causes waste of an arithmetic section in an ALU or memory usage. This is because of an unused part arranged between I part data and R part data. Especially, it is a problem that at the time of executing an operation process using the DMF algorithm, efficient use of arithmetic capability and memory cannot be fully achieved.

SUMMARY OF THE INVENTION

An arithmetic unit of the present invention includes a memory, an arithmetic logic unit, a register and a combining circuit. The arithmetic logic unit executes a predetermined arithmetic operation with respect to the data read from memory. The register temporarily stores the data read from the memory. The combining circuit selects one of the arithmetic logic unit and the register. The combining circuit replaces a part of the data read from the memory with output data received from the selected one of the arithmetic logic unit and the register.

BRIEF DESCRIPTION OF THE DRAWINGS

FIG. 2 is a diagram showing arrangement of data to be stored in two memory blocks;

FIG. 3 is a diagram showing arrangement of data to be stored in two memory blocks;

FIG. 4 is a diagram showing arrangement of data to be stored in two memory blocks;

Figure 5:
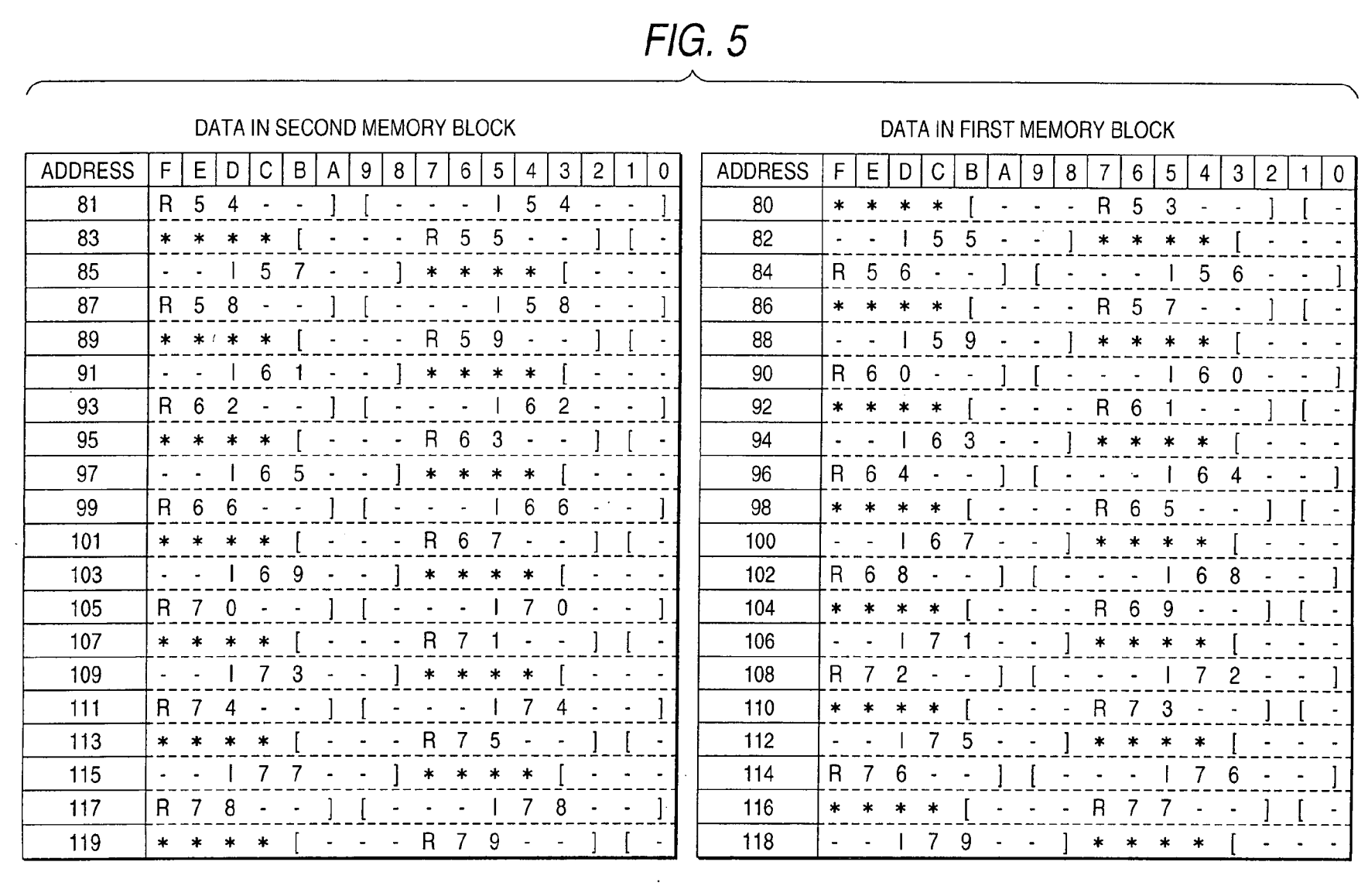

FIG. 5 is a diagram showing arrangement of data to be stored in two memory blocks;

Figure 6:
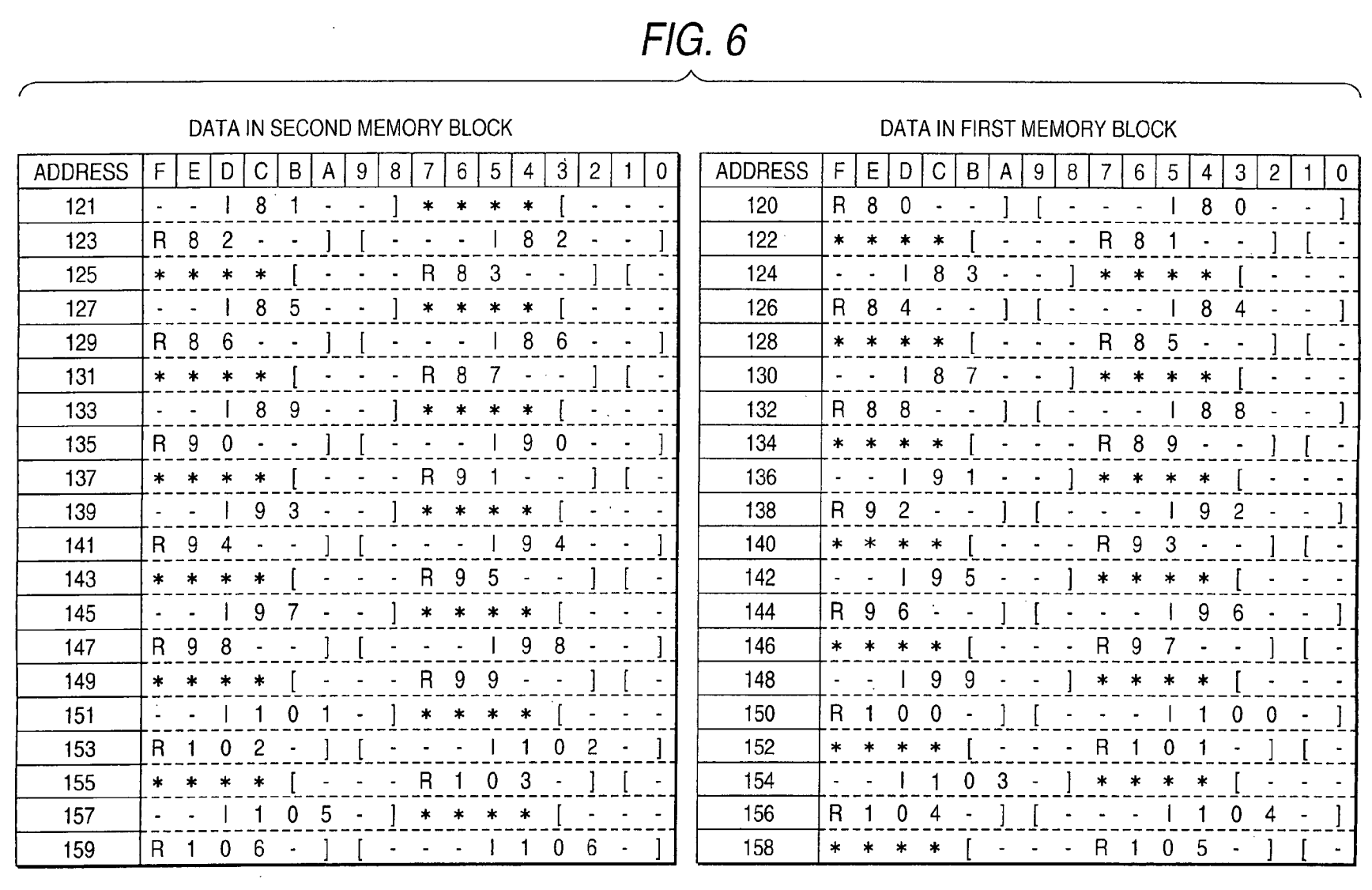

FIG. 6 is a diagram showing arrangement of data to be stored in two memory blocks;

FIG. 7 is a diagram showing arrangement of data to be stored in two memory blocks;

FIG. 8 is a diagram showing arrangement of data to be stored in two memory blocks;

FIG. 9 is a diagram showing arrangement of data to be stored in two memory blocks;

FIG. 10 is a diagram showing arrangement of data to be stored in two memory blocks;

FIG. 11 is a diagram showing arrangement of data to be stored in two memory blocks;

FIG. 12 is a diagram showing arrangement of data to be stored in two memory blocks;

DETAILED DESCRIPTION OF THE INVENTION

An embodiment of the present invention is aiming the reduction of memory usage amount to two-third by using a 16-bit register and a combining circuit, and by having a control section performed special control. Here, the memory usage amount is specifically the one at the time of executing an arithmetic process using the DMF algorithm.

Figure 1:
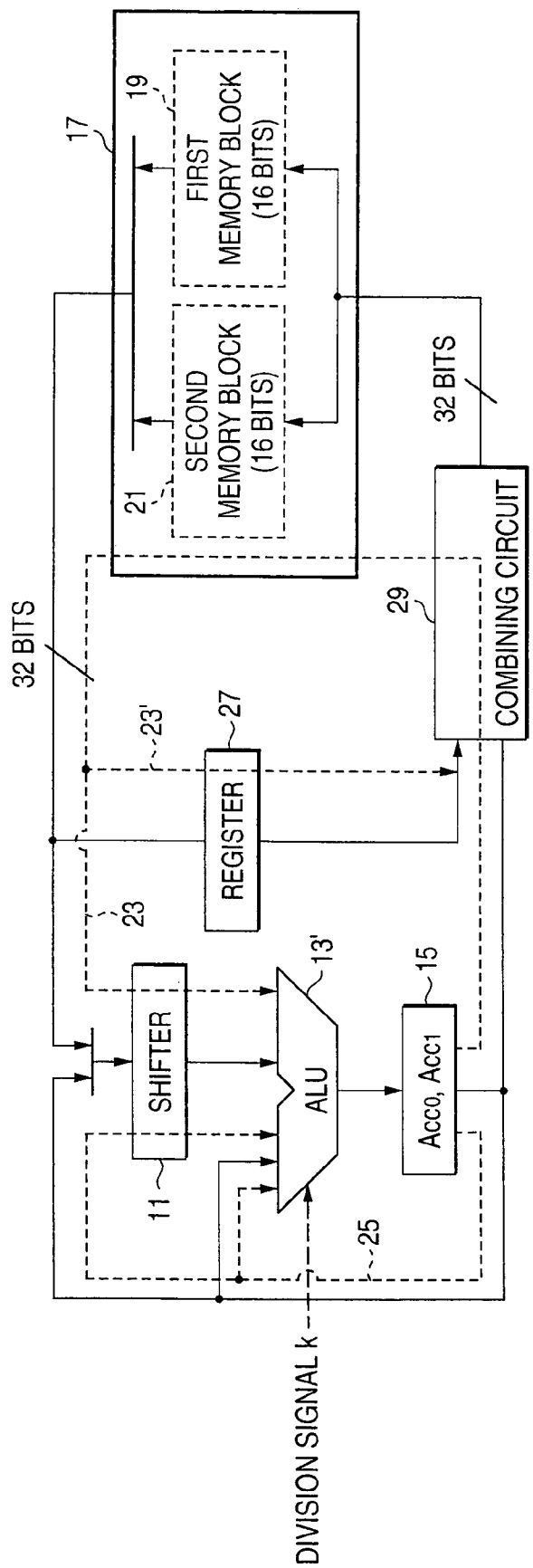
FIG. 1 is a diagram showing the structure of an arithmetic unit of the present invention.

FIG. 1 is a diagram showing the structure of an arithmetic unit of the present invention.

The arithmetic unit of the invention is so structured as to allow, at high speed with less memory, an arithmetic operation of data in which a word is not standard $2^n$-bit wide.

The embodiment of the invention is now described below by taking a DSP for a third generation mobile phone as an example. The accompanying drawings are all schematic intended only to provide overall understanding of the present invention. In each drawing, any common component is provided with the same reference numeral, and not described twice.

A DSP of the present embodiment includes, as shown in FIG. 1, a register 27 and a combining circuit 29. The register 27 is provided for temporarily storing data coming from memory 17. As to the data coming from the memory 17, i.e., the data temporarily stored in the register 27, the combining circuit 29 is provided for partially replacing it with data coming from an ALU 13'. Here, similarly to other components, the register 27 and the combining circuit 29 are both under the control of a control section, which is not shown. The ALU 13' of the embodiment is provided with a function of dividing a carry signal at an arbitrary position responding to a division signal K. This will be described later.

In the embodiment, the memory 17 is so designed as to be substitutable with general-purpose memory already quite popular on the market. Herein, data to be stored in the memory 17 is so arranged as shown in FIGS. 2 to 12. The control section (not shown) performs special control the memory 17 to make an arithmetic operation easier for the ALU 13'.

FIGS. 2 to 12 are diagrams showing arrangement of data to be stored in two memory blocks. Specifically, FIG. 2 shows approximate arrangement of data to be stored in the memory 17, and FIGS. 3 to 12 each show detailed arrangement of data to be stored in the memory 17. In FIGS. 3 to 12, "[-In-]" denotes a region in which I part data is stored, "[-Rn-]" denotes a region in which R part data is stored, and "*" denotes a region in which unused data is stored.

As shown in FIGS. 2 to 12, the memory 17 successively performs data storage into first and second 16-bit memory blocks 19 and 21. Here, stored is 24-bit data, which is a combination of 10-bit I part data, 10-bit R part data, and 4-bit unused data. Such data storage in the embodiment successfully reduces an unused region of the memory 17 from 12/32=37.5% to 4/32=12.5%.

Note here that, the unused data is preferably so changed in bit width that data subsequent thereto starts from 0th or 8th bit with the reasons described later. In example of FIG. 2, the unused data is 4 bits in width because both I part data and R part data are 10 bits in width. If the I part data or the R part data is changed in bit width, the unused data is preferably changed in bit width correspondingly so that the subsequent data starts from 0th or 8th bit.

In the present embodiment, the control section (not shown) performs the following control to the memory 17.

As an example, the memory 17 stores such data as shown in FIGS. 3 to 12.

Figure 17:
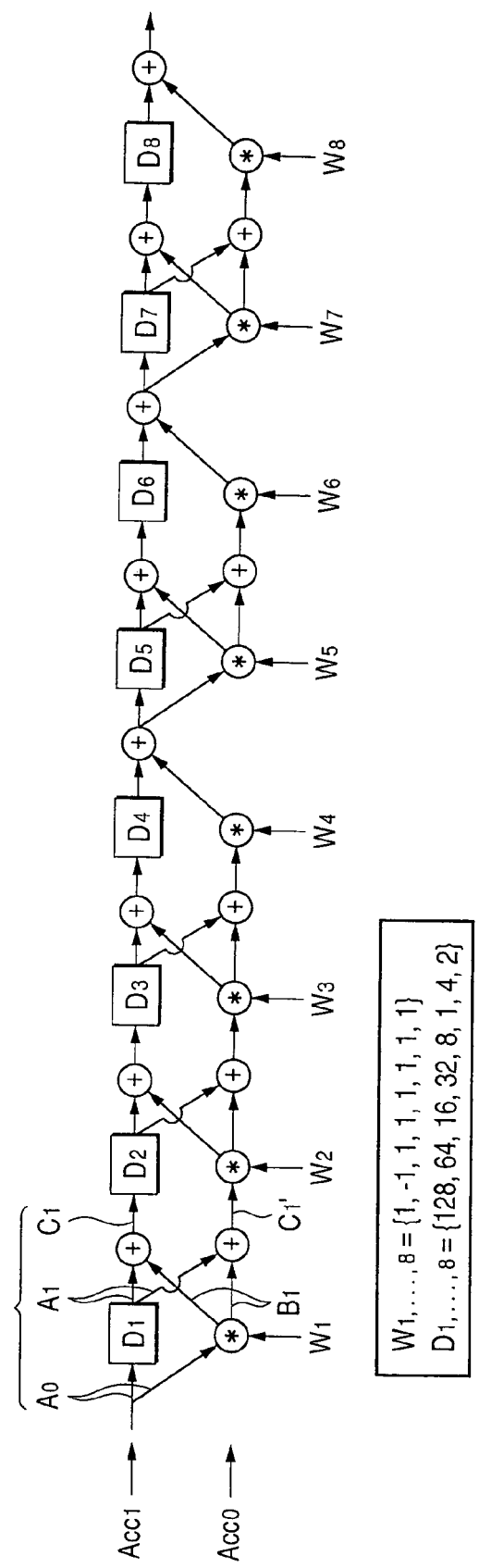
FIG. 17 is a diagram roughly showing a DMF algorithm.
Figure 18:
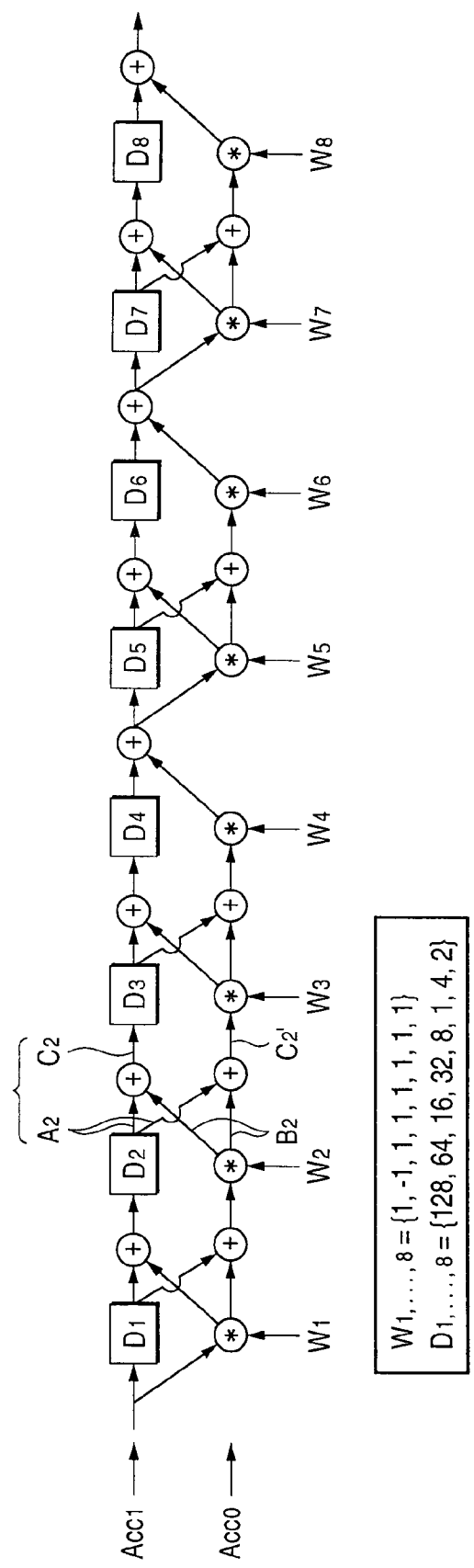
FIG. 18 is a diagram roughly showing the DMF algorithm.

The control section provides an input $A_0$ to the ALU 13' based on the DMF algorithm shown in FIGS. 17 and 18. Herein, the input $A_0$ is presumed as being I0 part data and R0 part data. The I0 part data and R0 part data are stored at addresses 0 and 1 of the memory 17. The control section causes the data stored at addresses 0 and 1 of the memory 17 to go to the ALU 13' via a shifter 11, and also to the register 27 for temporary storage. Then, the control section causes the ALU 13' to execute an arithmetic process, and the arithmetic result is temporarily stored in an accumulator (hereinafter, referred to as Acc) 15. Thereafter, the control section causes the register 27 to output the data temporarily stored therein to the combining circuit 29, and the Acc 15 to output the arithmetic result temporarily stored therein to the combining circuit 29. The data thus output to the combining circuit 29 is combined under the control to be described later, and the combination result is then output to the memory 17. The memory 17 stores thus received combination result at original addresses 0 and 1.

The control section supplies an output $A_1$ to the ALU 13' based on the DMF algorithm. Here, the output $A_1$ is of a delay value $D_1$. In this example, because the delay value $D_1$ denotes 128 cycles, the output $A_1$ is data stored with 0+128=128 cycles delayed. That is, the data is I128 part data and R128 part data, which are stored at addresses 192 and 193 of the memory 17, respectively. The control section provides data thus stored at addresses 192 and 193 to the ALU 13' via the shifter 11. The data is also provided to the register 27 for temporary storage therein. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 is combined therein under the control which will be described later, and the combination result is output to the memory 17. Then, the memory 17 is so controlled as to store the combination result at original addresses 192 and 193.

The control section also supplies an output $A_2$ to the ALU 13' based on the DMF algorithm. Herein, the output $A_2$ is of a delay value $D_2$. In this example, because the delay value $D_2$ denotes 64 cycles, the output $A_2$ is data stored with 128+64=192 cycles delayed. That is, the data is I192 part data and R192 part data, which are stored at addresses 288 and 289 of the memory 17, respectively. The control section provides data thus stored at addresses 288 and 289 of the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 288 and 289.

The control section also supplies an output $A_3$ to the ALU 13' based on the DMF algorithm. Herein, the output $A_3$ is of a delay value $D_3$. In this example, because the delay value $D_3$ denotes 16 cycles, the output $A_3$ is data stored with 192+16=208 cycles delayed. That is, the data is I208 part data and R208 part data, which are stored at addresses 312 and 313 of the memory 17, respectively. The control section provides data thus stored at addresses 312 and 313 of the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 312 and 313.

The control section also supplies an output $A_4$ to the ALU 13' based on the DMF algorithm. Herein, the output $A_4$ is of a delay value $D_4$. In this example, because the delay value $D_4$ denotes 32 cycles, the output $A_4$ is data stored with 208+32=240 cycles delayed. That is, the data is I240 part data and R240 part data, which are stored at addresses 360 and 361 of the memory 17, respectively. The control section provides data thus stored at addresses 360 and 361 of the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 360 and 361.

The control section also supplies an output $A_5$ to the ALU 13' based on the DMF algorithm. Herein, the output $A_5$ is of a delay value $D_5$. In this example, because the delay value $D_5$ denotes 8 cycles, the output $A_5$ is data stored with 240+8=248 cycles delayed. That is, the data is I248 part data and R248 part data, which are stored at addresses 372 and 373 of the memory 17, respectively. The control section provides data thus stored at addresses 372 and 373 of the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 372 and 373.

The control section also supplies an output $A_6$ to the ALU 13' based on the DMF algorithm. Herein, the output $A_6$ is of a delay value $D_6$. In this example, because the delay value $D_6$ denotes 1 cycle, the output $A_6$ is data stored with 248+1=249 cycles delayed. That is, the data is I249 part data and R249 part data, which are stored at addresses 373 and 374 of the memory 17, respectively. The control section provides data thus stored at addresses 373 and 374 in the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 373 and 374.

The control section also supplies an output $A_7$ to the ALU 13' based on the DMF algorithm. Herein, the output $A_7$ is of a delay value $D_7$. In this example, because the delay value $D_7$ denotes 4 cycles, the output $A_7$ is data stored with 249+4=253 cycles delayed. That is, the data is I253 part data and R253 part data, which are stored at addresses 379 and 380 of the memory 17, respectively. The control section provides data thus stored at addresses 379 and 380 in the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 379 and 380.

The control section also supplies an output $A_8$ to the ALU 13' based on the DMF algorithm. Herein, the output $A_8$ is of a delay value $D_8$. In this example, because the delay value $D_8$ denotes 2 cycles, the output $A_8$ is data stored with 253+2=255 cycles delayed. That is, the data is I255 part data and R255 part data, which are stored at addresses 382 and 383 of the memory 17, respectively. The control section provides data thus stored at addresses 382 and 383 in the memory 17 to the ALU 13' via the shifter 11. The data is also provided to the register 27 for temporary storage. Next, the control section has the ALU 13' executed an arithmetic process, and the arithmetic result is temporarily stored in the Acc 15. The data temporarily stored in the register 27 is output to the combining circuit 29, and the arithmetic result temporarily stored in the Acc 15 is also output to the combining circuit 29. The data and result output to the combining circuit 29 are combined therein under the control which will be described later, and the combination result is output to the memory 17. Then, the memory 17 is so controlled as to store the combination result at original addresses 382 and 383.

Thereafter, the I255 part data and the R255 part data at address 383 are provided with the input $A_0$, which is of the next delay value $D_1$. During the next arithmetic process, the control section regards address 383 as new address 0, and operates similarly to the above.

Figure 13:
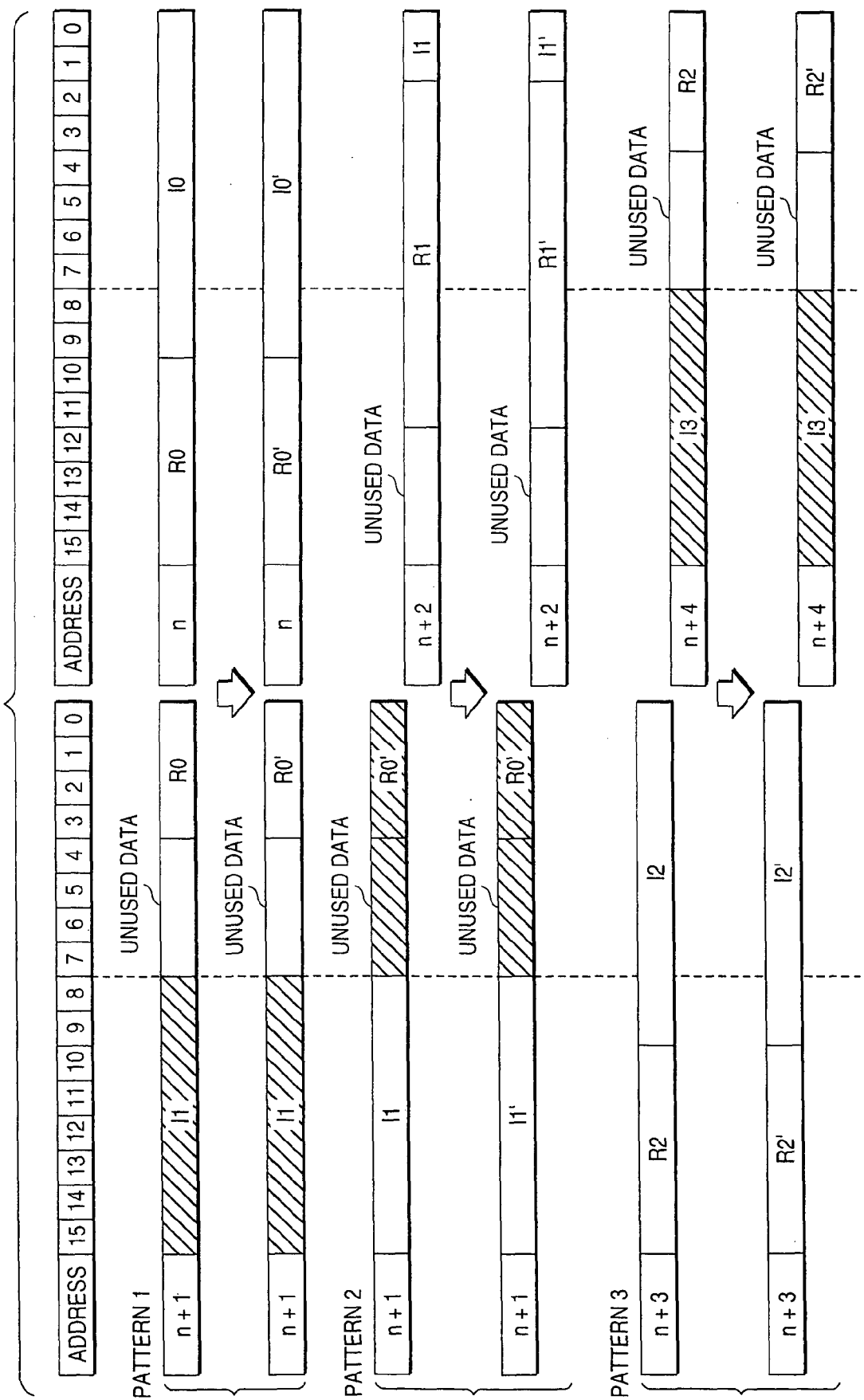
FIG. 13 is a diagram showing change of data to be stored in two memory blocks.

In the above operation, data changes in three patterns as shown in FIG. 13. Specifically, FIG. 13 is a diagram showing change of data to be stored in two memory blocks. In the drawing, a blank region indicates a part in which data is to be updated, and a diagonally shaded region indicates a part in which no data is to be updated.

In each pattern of change in FIG. 13, components in the DSP operate as follows.

In a pattern 1 of FIG. 13, first, the control section reads data stored at address n from the first memory block 19. Also, the control section reads data stored at address n+1 from the second memory block 21. Thus read data are output to the shifter 11 and the register 27. The data stored at address n is a part of a combination of the I0 part data and R0 part data. The data stored at address n+1 is a part a combination of the R0 data, the unused data, and I1 part data.

The shifter 11 performs phase adjustment by shifting, by a predetermined number of bits, data coming from the accumulator 15, the memory 17, and the like.

Figure 14:
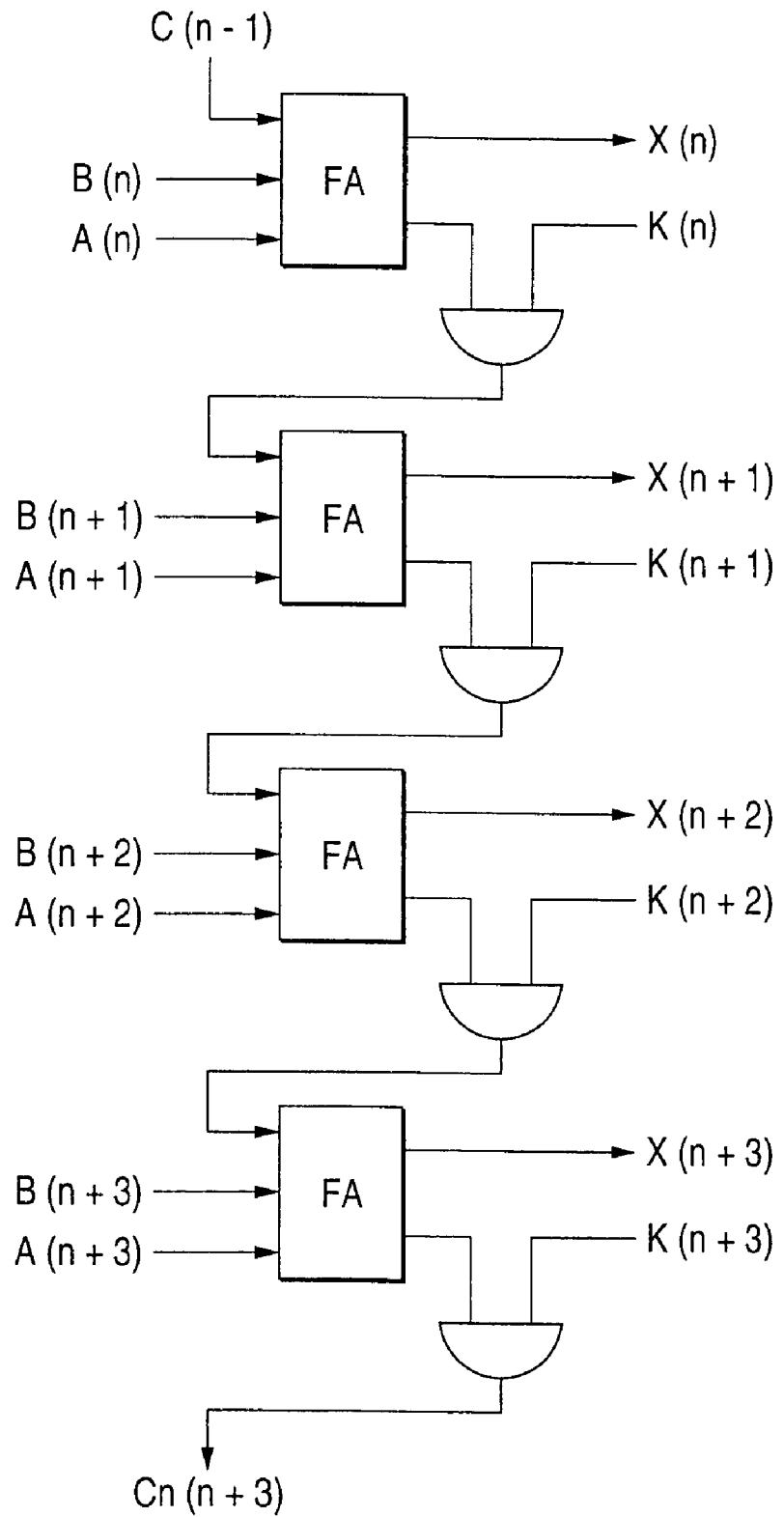
FIG. 14 is a diagram showing the internal structure of an ALU of the present embodiment.

FIG. 14 is a diagram showing the internal structure of the ALU 13' of the present embodiment. In FIG. 14, A and B denote data coming from the first and second memory blocks 19 and 21 via the shifter 11, C denotes a carry signal, K a division signal, X an output signal, and FA an add operation circuit.

The ALU 13' divides the data coming from the shifter 11 into data including I0 part data and R0 part data (hereinafter, referred to as arithmetic data) and other data (non-arithmetic data). Such a division is performed based on a division signal K coming from the control section, and only when the division signal K is indicating 0. Here, the arithmetic data corresponds to an output signal X shown in FIG. 14.

The ALU 13' receives, from the accumulator 15, an arithmetic result under the same cycle as that of the current arithmetic process. Thus received arithmetic result is referred to as last cycle arithmetic result, and is data including both I part data and R part data. The ALU 13' uses the arithmetic data received from the shifter 11 and the last cycle arithmetic result from the accumulator 15 to execute an arithmetic operation under the above-described DMF algorithm. In FIG. 13, the arithmetic result derived thereby is indicated as combination data of I0' part data and R0' part data.

The arithmetic result is output from the ALU 13' to the accumulator 15 for storage, and for output to the combining circuit 29 along a first route 23. Also, the arithmetic result is output to the ALU 13' along a second route 25 at a predetermined timing under the control of the control section.

On the other hand, under the control of the control section, the register 27 outputs the data coming from the memory 17 at a predetermined timing to the combining circuit 29 along a third route 23'.

As to the data coming from the register 27 along the third route 23', under the control of the control section, the combining circuit 29 performs data division at 8-bit intervals. Out of thus divided data, the arithmetic data (i.e., low-order 8 bits and high-order 8 bits stored in the first memory block 19, and the low-order 8 bits stored in the second memory block 21) is replaced with the data coming from the ALU 13' along the first route 23. To the resulting data, the non-arithmetic data (i.e., high-order 8 bits stored in the second memory block 21) is added to generate output data. Thus generated output data is forwarded to the memory 17.

The memory 17 stores the output data coming from the combining circuit 29 at original addresses. More specifically, the low-order 16 bits of the output data are stored at address n of the first memory block 19, and the high-order 16 bits thereof at address n+1 of the second memory block 21.

After the data storage, with the pattern 1, as to the data stored in the first and second memory blocks 19 and 21, only the high-order 8 bits stored in the second memory block 21 remain the same, but the rest are updated to new values.

In a pattern 2 shown in FIG. 13, the control section reads data stored at address n+1 from the second memory block 21. Also, the control section reads the data stored at address n+2 from the first memory block 19. Thus read data are output to the shifter 11 and the register 27. Here, the data stored at address n+1 is a part of the R0' part data, the unused data, and a part of the I1 part data. The data stored at address n+2 is a part of the I1 part data, a part of R1 part data, and the unused data.

With respect to the data coming from the accumulator 15, the memory 17, and the like, the shifter 11 performs phase adjustment by shifting a predetermined number of bits. The result is then output to the ALU 13'.

The ALU 13' divides the data coming from the shifter 11 into arithmetic data and non-arithmetic data based on a division signal K.

The ALU 13' then receives, from the accumulator 15, the last cycle arithmetic result. Using the arithmetic data received from the shifter 11 and the last cycle arithmetic result from the accumulator 15, the ALU 13' executes an arithmetic operation under the DMF algorithm. FIG. 13 shows the arithmetic result derived thereby as combination data of I1' part data and R1' part data.

The arithmetic result is output from the ALU 13' to the accumulator 15 for storage, and for output to the combining circuit 29 along the first route 23. Also, the arithmetic result is output to the ALU 13' along the second route 25 at a predetermined timing under the control of the control section.

On the other hand, under the control of the control section, the register 27 outputs the data coming from the memory 17 at a predetermined timing along the third route 23' to the combining circuit 29.

As to the data coming from the register 27 along the third route 23', under the control of the control section, the combining circuit 29 performs data division at 8-bit intervals. Out of thus divided data, the arithmetic data (i.e., the high-order 8 bits stored in the second memory block 21, and high-order 8 bits and low-order 8 bits stored in the first memory block 19) is replaced with the data coming from the ALU 13' along the first route 23. To the resulting data, the non-arithmetic data (i.e., low-order 8 bits stored in the second memory block 21) is added to generate output data. Thus generated output data is forwarded to the memory 17.

The memory 17 stores the output data coming from the combining circuit 29 at original addresses. More specifically, the low-order 16 bits of the output data are stored at address n+1 of the second memory block 21, and the high-order 16 bits thereof at address n+2 of the first memory block 19.

After the data storage, with the pattern 2, as to the data stored in the first and second memory blocks 19 and 21, only the low-order 8 bits stored in the second memory block 21 remain the same, but the rest are updated to new values.

In a pattern 3 shown in FIG. 13, the control section reads data stored at address n+3 from the second memory block 21. Also, the control section reads the data stored at address n+4 from the first memory block 19. Thus read data are output to the shifter 11 and the register 27. Here, the data stored at address n+3 is I2 part data, and a part of R2 part data. The data stored at address n+4 is a part of the R2 part data, the unused data, and I3 part data.

With respect to the data coming from the accumulator 15, the memory 17, and the like, the shifter 11 performs phase adjustment by shifting a predetermined number of bits. The result is then output to the ALU 13'.

The ALU 13' divides the data coming from the shifter 11 into arithmetic data and non-arithmetic data based on a division signal K.

The ALU 13' then receives, from the accumulator 15, the last cycle arithmetic result. Using the arithmetic data received from the shifter 11 and the last cycle arithmetic result from the accumulator 15, the ALU 13' executes an arithmetic operation under the DMF algorithm. FIG. 13 shows the arithmetic result derived thereby as combination data of I2' part data and R2' part data.

The arithmetic result is output from the ALU 13' to the accumulator 15 for storage, and for output to the combining circuit 29 along the first route 23. Also, the arithmetic result is output to the ALU 13' along the second route 25 at a predetermined timing under the control of the control section.

On the other hand, under the control of the control section, the register 27 outputs the data coming from the memory 17 at a predetermined timing along the third route 23' to the combining circuit 29.

As to the data coming from the register 27 along the third route 23', under the control of the control section, the combining circuit 29 performs data division at 8-bit intervals. Out of thus divided data, the arithmetic data (i.e., low-order 8 bits and high-order 8 bits stored in the second memory block 21, and the low-order 8 bits stored in the first memory block 19) is replaced with the data coming from the ALU 13' along the first route 23. To the resulting data, the non-arithmetic data (i.e., high-order 8 bits stored in the first memory block 19) is added to generate output data. Thus generated output data is forwarded to the memory 17.

The memory 17 stores the output data coming from the combining circuit 29 at original addresses. More specifically, the low-order 16 bits of the output data are stored in address n+3 of the second memory block 21, and the high-order 16 bits thereof at address n+4 of the first memory block 19.

After the data storage, with the pattern 3, as to the data stored in the first and second memory blocks 19 and 21, only the high-order 8 bits stored in the first memory block 19 remain the same, but the rest are updated to new values.

Figure 15:
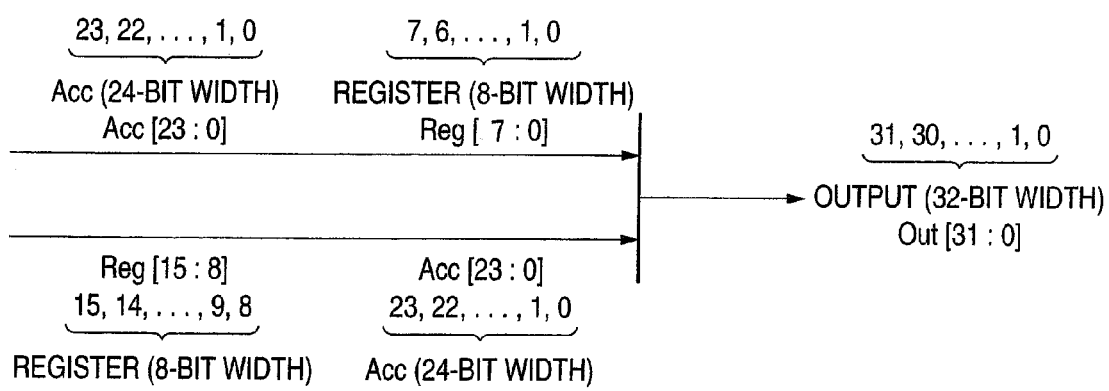
FIG. 15 is a diagram showing change of output from a combining circuit.

FIG. 15 is a diagram showing change of output data in the combining circuit 29. In FIG. 15, Acc[23:0] and Reg[7:0] on the upper left, and Reg[15:8] and Acc[23:0] on the lower left are data generated through combination, by the combining circuit 29, of outputs from the Acc 15 and the register 27. Further, Out[31:0] on the right side is output data to be output to the memory 17 after selecting by the combining circuit 28 any one of Acc[23:0] and Reg[7:0] on the upper left, and Reg[15:8] and Acc[23:0] on the lower left. This selection is made based on original addresses of the data read from the memory 17.

Here, Acc [x:y] represents output data from the accumulator 15, between xth bit and yth bit. Reg[x:y] represents output data from the register 27, between xth bit and yth bit. For example, Acc[23:0] and Reg[7:0] represent a combination of 24-bit output data from the accumulator 15 between 0th bit and 23rd bit, and 8-bit output data from the register 27 between 0th bit and 7th bit. Similarly, Out[x:y] represents output data from the combining circuit 29 between xth bit and yth bit. For example, Out[31:0] represents 32-bit output data from the combining circuit 29 between 0th bit and 31st bit.

For every arithmetic process, the control section provides I255 part data and R255 part data at address 383 with the input $A_0$ of the next delay value $D_1$. In the next arithmetic process, the control section regards address 383 as new address 0 for process execution. This is equivalent to executing the process with a reference point moved to the left by one under the assumption that addresses 0 and 383 of the memory 17 are connected as a ring. This successfully allows the DSP to output data for arithmetic operation in a preferable manner with simpler control.

Figure 16:
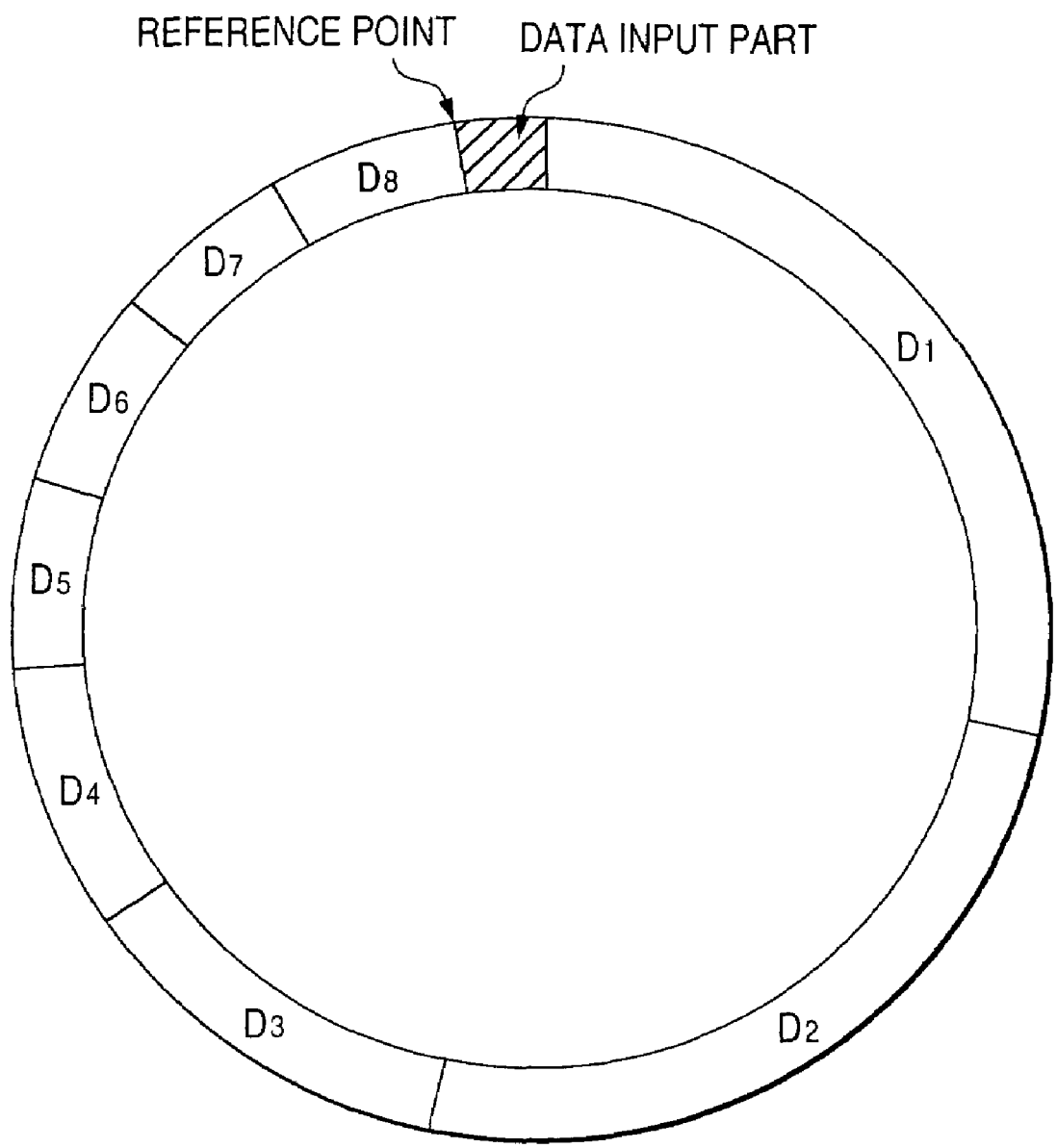
FIG. 16 is a diagram showing arrangement of cyclic data.

Such a control is described in more detail referring to FIG. 16. FIG. 16 is a diagram showing arrangement of cyclic data. In the drawing, a diagonally shaded region indicates a section to which data is input.

The control section cyclically uses data stored at a given address of the memory 17 determined by the DMF algorithm as output data of the delay values $D_1$, $D_2$, $D_3$, $D_4$, $D_5$, $D_6$, $D_7$, and $D_8$. For every arithmetic process, these data are updated to a result derived by arithmetic operation using the patterns 1 to 3 as output data of each of the delay values $D_1$ to $D_8$. Here, the output data of the last delay value $D_8$ will be head input data $D_0$ of the delay value $D_0$ for the next arithmetic process. In such a manner, the arithmetic process in a cycle of the DMF algorithm is executed. Then, the control section moves the reference position of FIG. 16 to the left by a predetermined amount (one in this example) before executing the next arithmetic process. The arithmetic process at this time is similar in operation to the above. In this manner, the control section can read input and output corresponding to the delay values successively and easily from the memory 17. Such a function can be easily realized by utilizing modulo addressing, which is a standard provision in the DSP.

Described next is the operation of components in the DSP. Herein, the ALU 13' is able to cut a carry signal C at an arbitrary bit position based on a division signal K or a register value. In this embodiment, the ALU 13' cuts the carry signal at 10-bit intervals.

If the data stored in the memory 17 has the structure of pattern 1 of FIG. 13, the components in the DSP operate as follows.

First, the control section reads 32-bit data in total from predetermined addresses of the first and second memory blocks 19 and 21. Thus read data is output to the shifter 11 and the register 27. Without shifting, the shifter 11 outputs the data as it is to the ALU 13'. The register 27 temporarily stores the data read out from predetermined addresses of the first and second memory blocks 19 and 21.

Then, the ALU 13' executes the arithmetic process, and outputs the result to $Acc_0$ and $Acc_1$.

After temporarily storing the arithmetic result, the $Acc_0$ and $Acc_1$ output the result to the shifter 11. The shifter 11 outputs the result as it is to the $Acc_0$ and $Acc_1$ via the ALU 13'. The $Acc_0$ and $Acc_1$ temporarily store the result again.

Thereafter, the register 27 outputs the data in its storage to the combining circuit 29, and at the same time, the $Acc_0$ and $Acc_1$ output the arithmetic result derived by the ALU 13' to the combining circuit 29.

Next, the combining circuit 29 combines the data stored in the register 27 and the arithmetic result derived by the ALU 13' and stored in the $Acc_0$ and $Acc_1$ and outputs the combination result to the memory 17. Here, the combination is so done as to make 8 least significant bits (LSB) as the data stored in the register 27. The combination result is stored by the memory 17 into original addresses of the first and second memory blocks 19 and 21.

If the data stored in the memory 17 has the structure of pattern 2 of FIG. 13, the components in the DSP operate as follows.

First, the control section reads 32-bit data in total from predetermined addresses of the first and second memory blocks 19 and 21. Thus read data is output to the shifter 11 and the register 27. The shifter 11 outputs the data to the ALU 13' after shifting the data by 8 bits to the right. The register 27 temporarily stores the data read out from predetermined addresses of the first and second memory blocks 19 and 21.

Then, the ALU 13' executes the arithmetic process, and outputs the arithmetic result to the $Acc_0$ and $Acc_1$. After temporarily storing the result, the $Acc_0$ and $Acc_1$ output the result to the shifter 11. The shifter 11 outputs the result, after shifting 8 bits to the left, to $Acc_0$ and $Acc_1$ via the ALU 13'. The $Acc_0$ and $Acc_1$ temporarily store thus derived result again.

Thereafter, the register 27 outputs the data in its storage to the combining circuit 29, and at the same time, the $Acc_0$ and $Acc_1$ output the result by the ALU 13' shifted by 8 bits to the left to the combining circuit 29.

Next, the combining circuit 29 combines the data stored in the register 27 and the result derived by the ALU 13' and stored in the $Acc_0$ and $Acc_1$, and outputs the combination result to the memory 17. Here, the combination is so done as to make 8 most significant bits (MSB) as the data stored in the register 27. The combination result is stored by the memory 17 into original addresses of the first and second memory blocks 19 and 21.

If the data stored in the memory 17 has the structure of pattern 3 of FIG. 13, the components in the DSP operate as follows.

First, the control section reads 32-bit data in total from predetermined addresses of the first and second memory blocks 19 and 21. Thus read data is output to the shifter 11 and the register 27. Without shifting, the shifter 11 outputs the data as it is to the ALU 13'. The register 27 temporarily stores the data read out from predetermined addresses of the first and second memory blocks 19 and 21.

Then, the ALU 13' executes the arithmetic process, and outputs the arithmetic result to the $Acc_0$ and $Acc_1$. After temporarily storing the result, the $Acc_0$ and $Acc_1$ output the result to the shifter 11. The shifter 11 outputs the result as it is to the $Acc_0$ and $Acc_1$ via the ALU 13'. The $Acc_0$ and $Acc_1$ temporarily store the result again.

Thereafter, the register 27 outputs the data in its storage to the combining circuit 29, and at the same time, the $Acc_0$ and $Acc_1$ output the result derived by the ALU 13' to the combining circuit 29.

Next, the combining circuit 29 combines the data stored in the register 27 and the result derived by the ALU 13' and stored in the $Acc_0$ and $Acc_1$, and outputs the combination result to the memory 17. Here, the combination is so done as to make 8 least significant bits (LSB) as the data stored in the register 27. The combination result is stored by the memory 17 into original addresses of the first and second memory blocks 19 and 21.

Described below is an arithmetic process in the ALU 13'. FIGS. 17 and 18 are diagrams roughly showing the DMF algorithm. In FIGS. 17 and 18, parts parenthesized are taken as examples to describe an arithmetic operation in detail.

First, the control section reads 32-bit data from addresses 0 and 1 of the first and second memory blocks 19 and 21. The read data is output to the shifter 11 and the register 27. Without shifting, the shifter 11 outputs the data as it is to the ALU 13'. The register 27 temporarily stores the data read from addresses 0 and 1 of the first and second memory blocks 19 and 21. Then, the ALU 13' executes an arithmetic process.

In the process, the control section generates a division signal K based on the data structure. Based on thus generated division signal K, the ALU13' divides the data read from addresses 0 and 1 of the first and second memory blocks 19 and 21 to derive an input $A_0$. As shown in FIG. 17, the ALU 13' then calculates $A_1$, $B_1$, $C_1$ and $C_1'$. Out of the arithmetic result thus derived, those found in the upper part of FIG. 17 roughly showing the DMF algorithm (e.g., $C_1$) are stored in the $Acc_1$ of the accumulator 15, and those in the lower part (e.g., $B_1$ and $C_1'$) are stored in the $Acc_0$ of the accumulator 15. In such a manner, the arithmetic result is stored in the $Acc_0$ and $Acc_1$ of the accumulator 15.

The arithmetic result $C_1$ is overwritten at the tail of the data corresponding to the delay value $D_1$ stored in the $Acc_0$ and $Acc_1$ of the accumulator 15. Because the data $D_1$ and $D_2$ are successive, the arithmetic result $C_1$ will be input data of the next delay value $D_2$.

Note here that, among the data read from addresses 0 and 1 of the first and second memory blocks 19 and 21, non-arithmetic data is stored in the register 27. This part of data is combined together with the arithmetic result by the combining circuit 29. The combining circuit 29 outputs the combination result to the memory 17, and have the first and second memory blocks 19 and 21 stored the result at addresses 0 and 1. Accordingly, in the present embodiment, there is no need to take time for arithmetic operation of non-arithmetic data, thereby easily generating the output data. Further, the unused data can be written out as it is at the time of overwriting.

Referring to FIG. 18, the ALU 13' calculates $A_2$, $B_2$, $C_2$, and $C_2'$. Out of the arithmetic result thus derived, those found in the upper part of FIG. 18 roughly showing the DMF algorithm (e.g., $C_2$) are stored in the $Acc_1$ of the accumulator 15, and those in the lower part (e.g., $B_2$ and $C_2'$) are stored in the $Acc_0$ of the accumulator 15. In such a manner, the arithmetic result is stored in the $Acc_0$ and $Acc_1$ of the accumulator 15.

The arithmetic result $C_2$ is overwritten at the tail of the data corresponding to the delay value $D_2$ in the $Acc_0$ and $Acc_1$ of the accumulator 15. Because the data $D_2$ and $D_3$ are successive, the arithmetic result $C_2$ will be input data of the next delay value $D_3$.

In such a manner, the ALU 13' executes similar operation successively, finally deriving the arithmetic result.

Thereafter, the control section moves the reference point of FIG. 16 to the left by one to make the data stored in the memory 17 cyclically proceed. Then, the next arithmetic operation is executed.

As described in detail in the foregoing, by simply including the predetermined-bit register 27 and the combining circuit 29, the present invention successfully achieves effects of reducing the memory usage amount during DMF process. Thus, if utilized in the DSP used for the third generation mobile phone, the present invention can reduce the memory amount from 510 words to 384 words, that is, achieve reduction of 126 words.

Moreover, the present invention does not require circuit increase, achieving such effects with less cost.

While the invention has been described in detail, the foregoing description is in all aspects illustrative and not restrictive. It is understood that numerous other modifications and variations can be devised without departing from the scope of the invention. For example, in the embodiment, the memory 17 may be structured by 32-bit memory. Further, the present invention is applicable not only to the DSP but also to any devices executing processing with respect to 9-bit to 12-bit data.

As described above, by simply including the predetermined-bit register 27 and the combining circuit 29, the present invention can successfully achieve effects of reducing the memory usage amount during DMF process.

In the present invention, a data reading method may be claimed. In an arithmetic circuit including an arithmetic logic unit for executing a predetermined arithmetic operation and memory for data storage, following steps would be comprised. Data are read by $2^n$ bits from the memory including first and second memory blocks. The read data is divided into an arithmetic part to be used for an arithmetic process and a non-arithmetic part not to be used therefor. In the reading step, data reading is done, in a predetermined order, from the first and second memory blocks in the same stage, and from the second memory block and the first memory block in a subsequent stage. In the dividing step, the data read from the memory is divided into the arithmetic part and the non-arithmetic part by shifting the non-arithmetic part by a predetermined number of bits every time an arithmetic operation is executed.

What is claimed is:

1. An arithmetic unit comprising:
    a memory for storing data;
    an arithmetic logic unit for executing a predetermined arithmetic operation with respect to the data from the memory to provide first output data, the data being grouped into one of several patterns;
    a register for temporarily storing the data read from the memory, and providing the temporarily stored data as second output data; and
    a combining circuit for receiving the first output data from the arithmetic logic unit and the second output data from the register, and outputting combined data which is provided by replacing a part of the second output data with a part of the first output data based on the pattern of the data from the memory,
    wherein when the part of the second output data is replaced with the part of the first output data, the combining circuit shifts a position of data to be replaced in the second output data by a predetermined number of bits every time an operation process is executed.

2. An arithmetic unit according to claim 1, wherein the memory includes a plurality of memory blocks.

3. An arithmetic unit according to claim 1, further comprising a shifter for shifting data received from the memory and outputting the shifted data to the arithmetic logic unit.

4. An arithmetic unit according to claim 1, further comprising an accumulator for temporary storing data output from the arithmetic logic unit.

5. An arithmetic unit comprising:
    a memory storing data;
    an arithmetic logic unit executing a predetermined arithmetic operation with respect to the data from the memory to provide first output data, the data being grouped into one of several patterns;

a register temporarily storing the data read from the memory, and providing the temporarily stored data as second output data; and a combining circuit that carries out an operation process by receiving the first output data from the arithmetic logic unit and the second output data from the register, replacing a part of the second output data from the register with a part of the first output data from the arithmetic logic unit based on the pattern of the data from the memory to provide combined data, and outputting the combined data to the memory for storage.

6. An arithmetic unit according to claim 5, wherein the combining circuit shifts a position of data to be replaced in the second output data by a predetermined number of bits each successive operation process.

7. An arithmetic unit according to claim 5, wherein the memory includes a plurality of memory blocks.

8. An arithmetic unit according to claim 5, further comprising a shifter for shifting data received from the memory and outputting the shifted data to the arithmetic logic unit.

9. An arithmetic unit according to claim 5, further comprising an accumulator for temporary storing data output from the arithmetic logic unit.

* * * * *